US008944610B2

United States Patent
Nakata

(10) Patent No.: US 8,944,610 B2
(45) Date of Patent: Feb. 3, 2015

(54) IMAGE PROJECTION APPARATUS, CONTROL METHOD, CONTROL PROGRAM, AND STORAGE MEDIUM

(71) Applicant: Otoichi Nakata, Kanagawa (JP)

(72) Inventor: Otoichi Nakata, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/860,178

(22) Filed: Apr. 10, 2013

(65) Prior Publication Data
US 2013/0307995 A1 Nov. 21, 2013

(30) Foreign Application Priority Data

May 16, 2012 (JP) ................................. 2012-112592

(51) Int. Cl.
G03B 21/14 (2006.01)
H04N 17/00 (2006.01)
H04N 9/31 (2006.01)

(52) U.S. Cl.
CPC ............ H04N 17/00 (2013.01); H04N 9/3194 (2013.01); H04N 9/3114 (2013.01); H04N 9/3182 (2013.01)
USPC .................. 353/84; 353/30; 353/31; 353/94; 353/95; 353/99; 348/744; 348/746

(58) Field of Classification Search
CPC ... H04N 9/317; H04N 9/3114; H04N 9/3197; H04N 9/3182; H04N 9/3129; H04N 9/3173; H04N 9/3185; H04N 9/3194; H04N 9/3164; G02B 7/32; G02B 7/36; G03B 21/00; G03B 21/53; G03B 21/14; G03B 21/28
USPC ................. 353/30, 31, 69, 70, 84, 94, 95, 99; 348/742–747; 349/5, 7–9
See application file for complete search history.

(56) References Cited

U.S. PATENT DOCUMENTS 7,187,343 B2 * 3/2007 Pate ................................ 345/1.2
7,527,383 B2 * 5/2009 Hirata et al. .................... 353/69
(Continued)

FOREIGN PATENT DOCUMENTS

| CN | 101375612 A | 2/2009 |
| JP | 2002-23264 A | 1/2002 |

(Continued)

OTHER PUBLICATIONS

Extended European Search Report issued Jun. 18, 2013, in European Patent Application No. 13165407.1.

(Continued)

Primary Examiner — Sultan Chowdhury
(74) Attorney, Agent, or Firm — Oblon, Spivak, McClelland, Maier & Neustadt, L.L.P.

(57) ABSTRACT

An image projection apparatus includes a light source; a projected image outputting unit having multiple mirrors arranged in a matrix, to which radiating light emitted from the light source while controlling an angle of a light reflection face of each of the mirrors; a control unit controls the angle of light reflection face of the mirrors using the a division half-toning control based on image data of a projected image, and settings of control parameters used for the time division half-toning control; and an image capturing device to capture the projected mage. When the control unit detects a false contour in a projected test pattern image based on image data of the projected test pattern image captured by the image capturing device, the control unit corrects the control parameters for the time division half-toning control based on detection of the false contour.

8 Claims, 7 Drawing Sheets

(56) References Cited

U.S. PATENT DOCUMENTS

| | | | |
|---|---|---|---|
| 8,235,534 B2* | 8/2012 | Nakayama et al. | 353/69 |
| 8,269,902 B2* | 9/2012 | Plut | 348/745 |
| 2002/0027608 A1* | 3/2002 | Johnson et al. | 348/383 |
| 2005/0001991 A1 | 1/2005 | Ulichney et al. | |
| 2005/0062939 A1* | 3/2005 | Tamura | 353/69 |
| 2005/0162615 A1* | 7/2005 | Penn | 353/31 |
| 2006/0170880 A1* | 8/2006 | Dambach et al. | 353/84 |
| 2006/0203207 A1* | 9/2006 | Ikeda et al. | 353/70 |
| 2007/0216876 A1 | 9/2007 | Narikawa | |

FOREIGN PATENT DOCUMENTS

| | | |
|---|---|---|
| JP | 2007-279643 | 10/2007 |
| JP | 2008-015324 | 1/2008 |

OTHER PUBLICATIONS

Office Action issued Sep. 18, 2014 in European Patent Application No. 13165407.1-1502.

Chinese Office Action issued Nov. 2, 2014 for Chinese Patent Application No. 201310169392.X.

* cited by examiner

IMAGE PROJECTION APPARATUS, CONTROL METHOD, CONTROL PROGRAM, AND STORAGE MEDIUM

CROSS-REFERENCE TO RELATED APPLICATION

This application claims priority pursuant to 35 U.S.C. §119 to Japanese Patent Application No. 2012-112592, filed on May 16, 2012 in the Japan Patent Office, the disclosure of which is incorporated by reference herein in its entirety.

BACKGROUND

1. Technical Field

The present invention relates to an image projection apparatus for projecting images, a control method, a control program, and a storage medium storing the program.

2. Background Art

Image projection apparatuses known as projectors may employ a digital light processing (DLP: registered trademark) projector. The DLP projector employs a semiconductor device, called the digital micro-mirror device (DMD: registered trademark). having a large numbers of micro mirrors arranged in a matrix and used as light reflection faces whose tilt can be controlled within a given range of angles. As the light coming from a light source strikes the light reflection face of each of the micro mirrors of the DMD, the angle of the light reflection face of each of the micro mirrors is changed based on image signals, in which each of the micro mirrors can be set light-ON status (i.e., reflecting light to a screen) or light-OFF status (i.e., not reflecting light to the screen). In this configuration, the light coming from the light source can be selectively reflected to the screen by each of the micro mirrors to project a desired image on the screen. Further, a color wheel having three color filters, R (red), G (green), and B (blue), can filter light along its circumferential direction to project a color image. Specifically, the light coming from the light source is guided to the color wheel while rotating the color wheel having the three color filters, by which the light passes through the three color filters sequentially, and the R, G, and B lights are radiated on the DMD.

A problem with DLP projectors is that each DLP projector may have slightly different color reproduction properties (hereinafter, color properties) from any other. Therefore, even if the same image signal is input, different DLP projectors may project images with different color appearance and brightness. Thus, the same image signal may not be projected with the desired image quality.

Furthermore, a plurality of DLP projectors each having different color properties is concurrently used to provide a multi-screen display of a large scale. Therefore, the difference in color properties such as hue, value, and saturation between a plurality of images projected on the screen may be recognizable, and viewers feel the difference is unnatural and not acceptable. Because of variations in color properties of DLP projectors, methods of correcting the color properties of DLP projectors have been proposed.

Conventionally, images projected by a plurality of DLP projectors on a screen are captured by a camera for each of the DLP projectors to obtain color properties. The obtained color properties are then analyzed by comparison with a reference color property to determine relative differences. Based on that analysis, the color properties of projected images can be corrected.

For example, JP-2007-279643-A discloses a multi-screen display using a plurality of DLP projectors, in which a correction area is set for each screen, and a test pattern is projected on the multi-screen while changing color setting parameters for R, and B within a given range. Then, a camera captures an image of the test pattern at each correction area, and an average value of RGB of the image at each correction area captured by the camera is computed to conduct color correction. In this color correction, projection of the test pattern image, the capturing of the image of the test pattern, and the computing of the average value are repeated until the sum of the squares of differences between the computed average value of RGB and the reference value of RGB is minimized. Then, the color setting parameters of RGB satisfying a given acceptable condition are set to each of the DLP projectors.

Conventional color correction methods like that described above can correct differences in color properties among a plurality of DLP projectors. However, the methods may not handle occurrence of a false contour when time division half-toning control is used for the DLP projector. In the DLP projector, an angle of a light reflection face of each of the micro mirrors of the DMD can be switched between the light-ON status and the light-OFF status while being synchronized with a rotation of a color wheel and input image signals. The switching control (hereinafter, light-ON/OFF control) is conducted with time division to reproduce the colors of a projected image.

The half-toning expression, which expresses a color density level of the projected image, is conducted by a time division half-toning, which expresses half-toning by conducting the light-ON/OFF control for each of the micro mirrors using time division based on a desired image density.

The time division half-toning is conducted as follows. An output time of one image (one image frame) projected on a screen is divided into a light-ON time that sets the light-ON status for the micro mirrors, and a light-OFF time that sets the light-OFF status for the micro mirrors, and half-tone can be expressed by changing a ratio of the light-ON time and the light-OFF time. For example, if the first half of an output time of one frame is set as the light-ON time to generate white and the second half of the output time of one frame is set as the light-OFF time to generate black, the density of projected image becomes gray, which is a color intermediate between white and black.

However, when the time division half-toning control is conducted for the DLP projector, contour lines that do not exist in an original image (hereinafter, false contour) may appear in an area where brightness and/or color change gradually. The conventional color correction methods are not capable of preventing the occurrence of false contours.

SUMMARY

In one aspect of the present invention, an image projection apparatus is devised. The image projection apparatus includes a light source; a projected image outputting unit having multiple mirrors arranged in a matrix pattern, to which radiating light emitted from the light source while controlling an angle of a light reflection face of each of the mirrors is directed; a control unit, using a processing circuit, to control the angle of light reflection face of each of the mirrors of the projected image outputting unit using a time division half-toning control based on image data of an image, projected by the projected image outputting unit and settings of control parameters used for the time division half-toning control; an image capturing device to capture the image output by the projected image outputting unit. The control unit instructs the projected image outputting unit to project a test pattern image for image adjustment. When the control unit detects a false contour in the test pattern image based on image data of the projected test pattern image captured by the image capturing device, control unit corrects the settings of control parameters for the time division half-toning control based on a detection result of the false contour to suppress occurrence of the false contour.

In another aspect of the present invention, a method of projecting an image using an image projection apparatus having a light source and multiple mirrors arranged in a matrix pattern, to which radiating light emitted from the light source while controlling an angle of a light reflection face of each of the mirrors is devised. The method includes the steps of projecting a test pattern image for image adjustment; capturing a projected image of the test pattern image; detecting a false contour in the test pattern image based on image data of the captured test pattern image; controlling the angle of light reflection face of each of the mirrors using a time division half-toning control based on image data of an projected test pattern image and a value of control parameter used for the time division half-toning control; and correcting the value of control parameter used for the time division half-toning control upon detecting the false contour to suppress occurrence of the false contour.

In another aspect of the present invention, a non-transitory computer-readable storage medium storing a program that, when executed by a computer, causes the computer to execute a method of projecting an image using an image projection apparatus having a light source and multiple mirrors arranged in a matrix pattern, to which radiating light emitted from the light source while controlling an angle of a light reflection face of each of the mirrors, is devised. The method includes the steps of projecting a test pattern image for image adjustment; capturing a projected image of the test pattern image; detecting a false contour in the test pattern image based on image data of the captured test pattern image; controlling the angle of light reflection face of each of the mirrors using a time division half-toning control based on image data of an projected test pattern image and a value of control parameter used for the time division half-toning control; and correcting the value of control parameter used for the time division half-toning control upon detecting the false contour to suppress occurrence of the false contour.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
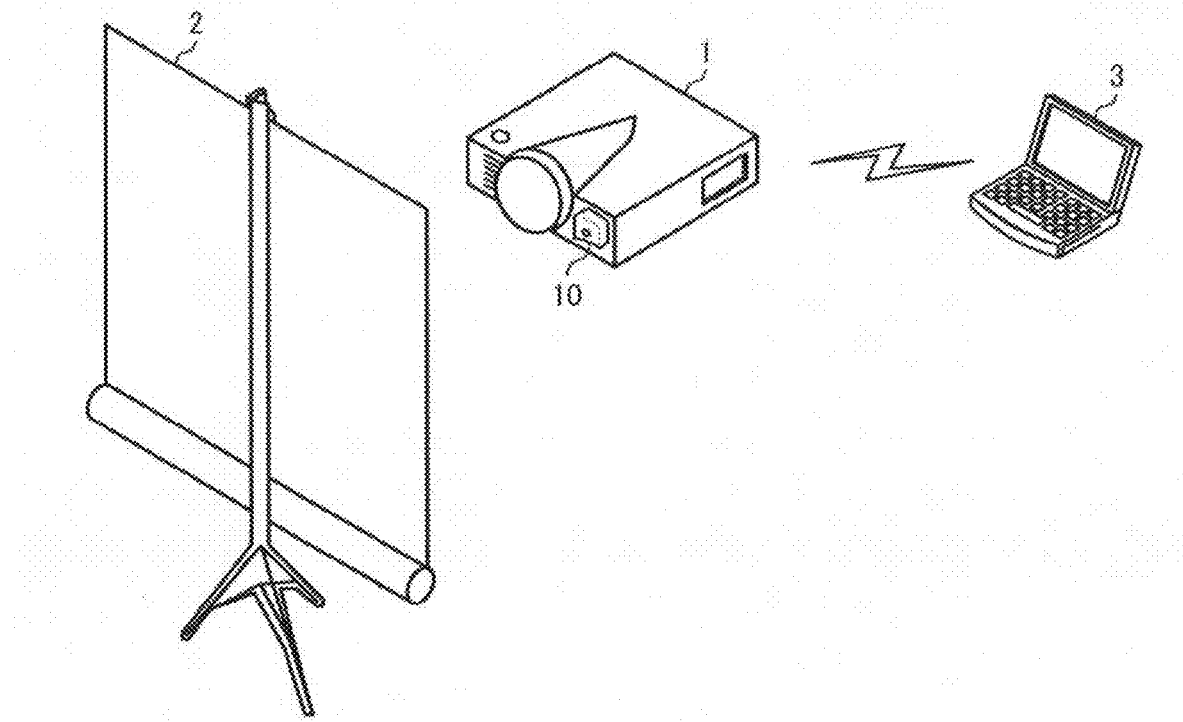
FIG. 1 shows a schematic configuration of an image projection system for projecting images using a projector according to an example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter.

A description is given of an image projection apparatus according to an example embodiment of the present invention with reference to drawings, wherein the image projection apparatus may be, for example, a digital light processing (DLP: registered trademark) projector. FIG. 1 shows an example of an image projection system using a projector according to an example embodiment. The image projection system includes, for example, a projector 1, a screen 2, and a signal generator 3. The projector 1 projects images onto the screen 2 used as an image projection face. The signal generator 3 is, for example, a personal computer, which outputs image data or signals used for image projection to the projector 1.

The projector 1 includes, for example, a camera module 10 used as an image capturing device. The camera module 10 can employ a solid state image sensor such as a charge coupled device (CCD) or complementary metal oxide semiconductor (CMOS) to capture images projected onto the screen 2. The camera module 10 is preferably a high speed camera that can constantly take images with a shutter speed such as the order of several milliseconds (e.g., $2/1000$ second).

In an example embodiment, the projector 1 includes a light source, a color wheel, a projected image outputting unit, and a control unit. The projected image outputting unit includes multiple micro mirrors arranged in a matrix pattern, wherein each micro mirror has a light reflection face to which light emitted from the light source is radiated. An angle of the light reflection face of each of the micro mirrors can be controlled. For example, a semiconductor device known as a digital micro-mirror device (DMD: registered trademark) can be used for such micro mirrors. Further, the projected image outputting unit includes an optical system that projects image lights generated and selectively reflected at the micro mirrors to the screen 2.

The color wheel is, for example, a circular disk rotatable about the axis of the color wheel and including a filter having of three colors corresponding to three primary colors arranged in a circumferential direction of the circular disk.

In the projector 1, a light emission control for the light source, and a time division half-toning control for the angle of light reflection face of the micro mirrors of the projected image outputting unit are synchronized with a rotation of the color wheel and image signals, by which a color image having a given half-toning or gradation can be projected onto the screen 2.

Figure 2:
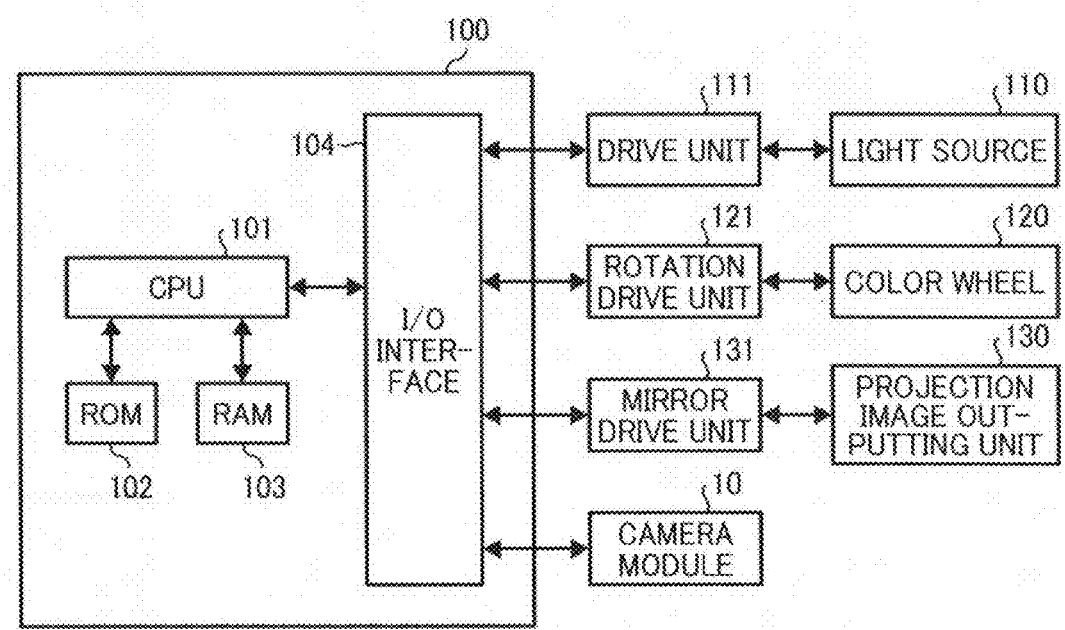
FIG. 2 shows a block diagram of a control system of the projector of FIG. 1 including a control unit.

FIG. 2 shows a block diagram of a control system of the projector 1 according to an example embodiment which includes a control unit 100. The control unit 100 is, for example, a micro-computer or processing circuit configured with a central processing unit (CPU) 101, internal memories such as a read-only-memory (ROM) 102 and a random access memory (RAM) 103, and an input/output (I/O) interface 104.

Further, the control unit 100 is connected to, via the I/O interface 104, a drive unit 111 of a light source 110, a rotation drive unit 121 of a color wheel 120, a mirror drive unit 131 that drives the micro mirrors of a projected image outputting unit 130, and the camera module 10. When one or more installed programs are executed, the control unit 100 can control each unit, and communicate control commands and various data with each unit.

Further, when a given program is executed, based on image data for a projected image and settings of control parameters for the time division half-toning control, the control unit 100 can control the angle of light reflection face of each of micro mirrors of the projected image outputting unit 130 using the time division half-toning control process. The control parameters for the time division half-toning control process include, for example, a rotation drive timing of the color wheel 120.

Further, when a given program is executed, the control unit 100 can function as a correction unit that corrects the settings of control parameters for the time division half-toning control. The control unit 100 instructs the projected image outputting unit 130 to project a test pattern image used for image adjustment, and instructs the camera module 10 to capture a projected image of the test pattern image. Based on the image data of the projected image captured by the camera module 10, the control unit 100 can detect a false contour. Based on a detection result of the false contour, the control unit 100 can correct the settings of control parameters to values that can suppress occurrence of the false contour. The test pattern image can be projected using test pattern image data used for correction/adjustment received from the signal generator 3. Further, if the control unit 100 of the projector 1 stores test pattern image data for image adjustment, which is used for correction/adjustment of the settings of control parameters for the time division half-toning control, in an internal memory, the signal generator 3 can be omitted.

As for the image projection system according to an example embodiment, the test pattern image data is input to the projector 1 from the signal generator 3, and then the projector 1 outputs or projects the test pattern image onto the screen 2 placed at a correct position. Then, the camera module 10 captures the test pattern image projected on the screen 2. The camera module 10 can constantly capture the test pattern image at a given capturing timing one by one frame with a given shutter speed (e.g., $2/1000$ seconds). The test pattern image data captured by the camera module 10 is transmitted to the control unit 100 of the projector 1.

Figure 3:
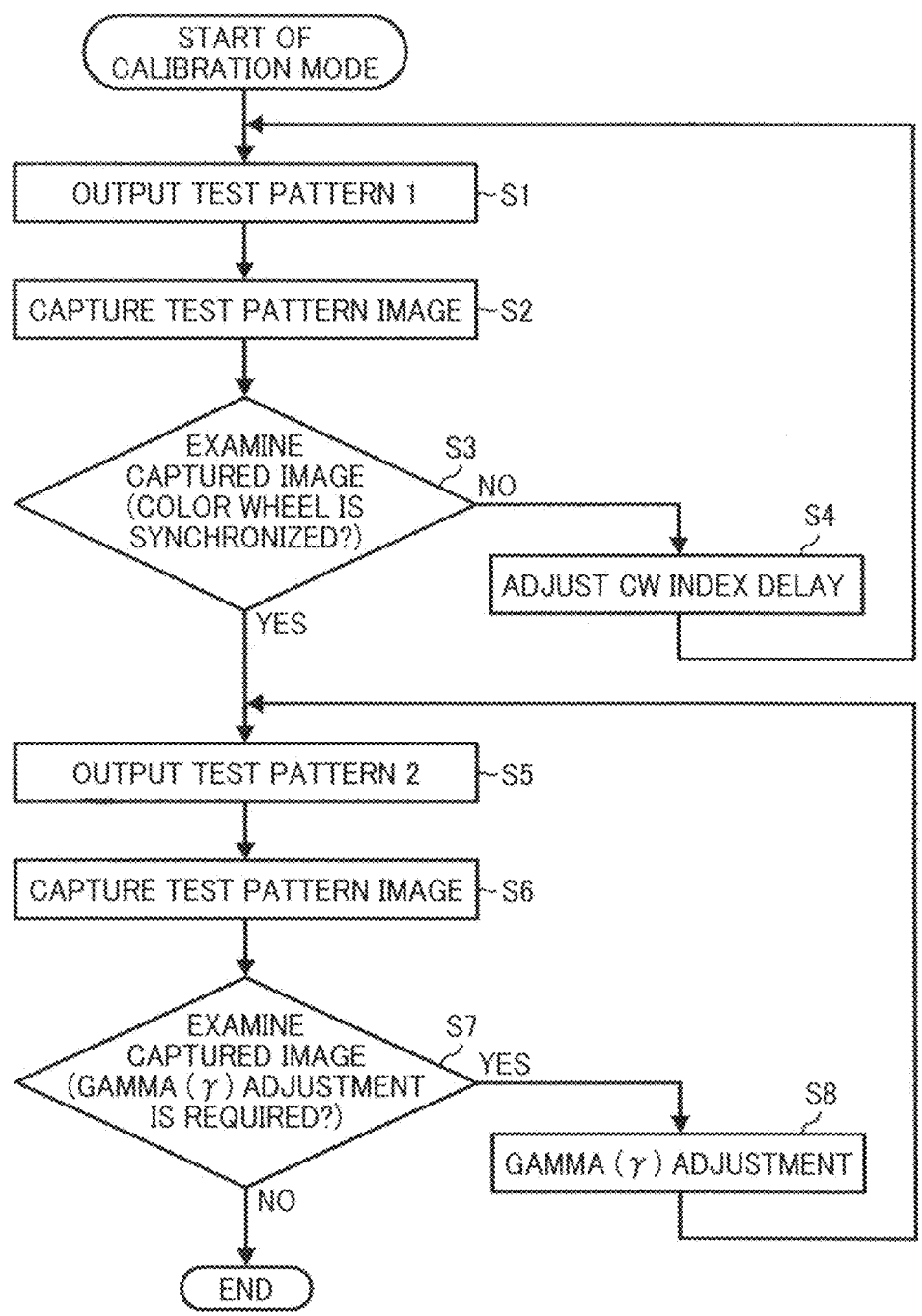
FIG. 3 shows a flowchart of steps of a calibration mode of the projector of FIG. 1.
Figure 4:
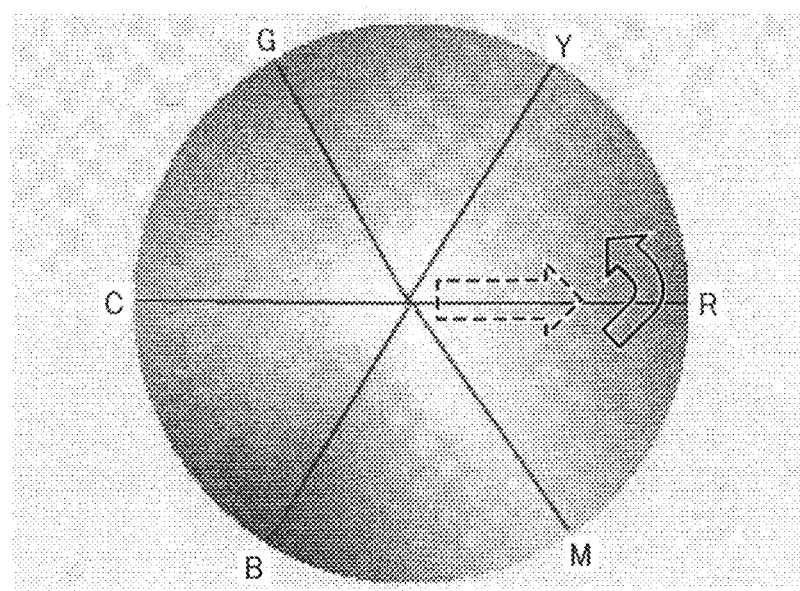
FIG. 4 shows a test pattern of Hue-Saturation plane for image adjustment projected on a screen.

A description is given of a half-toning correction process or calibration mode of the projector 1 according to an example embodiment. FIG. 3 shows a flowchart of steps of the calibration mode of the projector 1 according to an example embodiment, and FIG. 4 shows an example of a test pattern of Hue-Saturation plane for image adjustment used for an image projected on the screen 2.

As indicated in FIG. 3, a test pattern image is output as test pattern output 1, and projected onto the screen 2 (step S1). The test pattern image projected on the screen 2 is, for example, a Hue circle image pattern. As shown in FIG. 4, the Hue circle image pattern includes colors of RGB and color reproduction areas of cyan, magenta, yellow (CMY), in which Hue is arranged in the order of R, Y, G, C, B, and M as indicated by a curved arrow in FIG. 4, and further, Saturation changes from a neutral axis at the center of the circle to the highest saturation at the peripherals of the circle as indicated by a dotted arrow in FIG. 4.

Then, the camera module 10 captures the test pattern image projected on the screen 2 at a given timing, in which the first frame of the test pattern image is obtained as image data of image 1 (step S2). The test pattern image projected on the screen 2 can be captured by the camera module 10 at step S2 at an image capturing timing, which can be set as follows.

Figure 5:
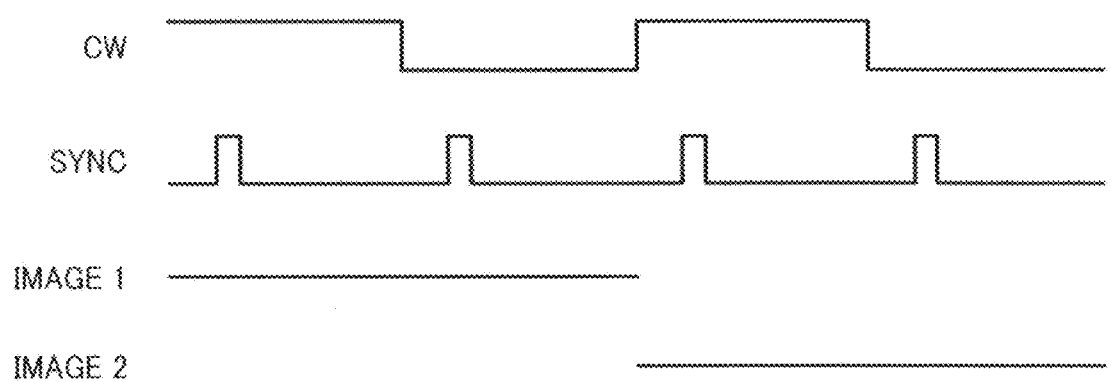
FIG. 5 shows a relationship a rotation timing of a color wheel, a light radiation timing of a light source, and a shutter timing to capture a projected image.

FIG. 5 shows a relationship between a rotation timing of the color wheel 120, a light radiation timing from the light source, and a shutter timing to capture a projected image. In FIG. 5, CW indicates a rotation timing of the color wheel 120 disposed in the projector 1. In an example case of FIG. 5, the time for projecting one frame image corresponds to one (1) cycle of color wheel (CW) 120, and the color wheel 120 rotates two (2) times, which is two-times of sequence, and one (1) frame of test pattern image is projected for the one (1) cycle of CW. Because the CW occurs for two times or cycles in FIG. 5, two (2) frames of test pattern images are projected.

Further, Sync indicates synchronization signals of an electrical ballast of a drive unit that controls a lamp pulse used for setting light-ON of a light source in the projector 1.

Further, image 1 indicates an image capturing timing of the first frame of the test pattern image by for the camera module 10, in which the test pattern image is captured by synchronized with the timing of image 1. Further, image 2 indicates an image capturing timing of the second frame of the test pattern image by for the camera module 10, in which the test pattern image is captured by synchronized with the timing of image 2. As such, the camera module 10 can be set with a given shutter speed, for example, that captures the first frame of the test pattern image for the first cycle of CW, and the second frame of the test pattern image for the second cycle of CW.

Then, image data of the first frame image (image 1) of the test pattern image captured by the camera module 10 is analyzed to examine the image condition (step S3). Specifically, based on image data of the captured test pattern image, image continuity of the test pattern image is examined at step S3 for each Hue of W (white), R (red), Y (yellow), G (green), C (cyan), B (blue), and M (magenta) in Saturation direction (see a dotted arrow in a test pattern of FIG. 4), in which it is examined whether the saturation information changed abruptly in pixel information. The saturation information can be obtained by converting RGB values of a captured image using Hue/Saturation/Value model to be described later. The S (Saturation) obtained by HSV conversion can be used as the saturation information.

The RGB values can be converted to HSV values as follows. If a minimum value among three values of RGB is set as MIN=MIN(RGB), and if a maximum value among three values of RGB is set as MAX=MAX(RGB), HSV values can be, for example, computed as follows.

As for H (Hue), when MAX=R, formula (1) can be used for computing.

$$H = 60 \times (G-B)/(MAX-MIN) + 0 \quad (1)$$

Further, when MAX=G, formula (2) can be used for computing.

$$H = 60 \times (B-R)/(MAX-MIN) + 120 \quad (2)$$

Further, when MAX=B, formula (3) can be used for computing.

$$H = 60 \times (R-G)/(MAX-MIN) + 240 \quad (3)$$

However, if H<0, H=H+360 is set.

Further, S (Saturation) and V (Value) can be computed using formulas (4) and (5).

$$S = (MAX-MIN)/MAX \quad (4)$$

$$V = MAX \quad (5)$$

For example, based on H (Hue) and S (Saturation) obtained by the above-described HSV conversion, it is examined whether S (Saturation) of pixels corresponding to R (red) on the test pattern (Hue-Saturation plane) shown in FIG. 4 changes without abrupt change, and it is examined whether simple increase of Saturation occurs. If the simple increase of Saturation does not occur, a false contour flag indicating an occurrence of false contour is issued. The similar process is conducted for Y, G, C, B, and M.

If the false contour flag is issued for all colors of R, Y, G, C, B, M (step S3: YES), the color wheel 120 may not be synchronized correctly. In this case, the setting value of "CW IndexDelay" used as a control parameter for a rotation control of the color wheel 120 is changed to adjust a rotation timing for the color wheel 120 (hereinafter, CW IndexDelay adjustment) (step S4). The CW IndexDelay adjustment can be conducted, for example, by adjusting a rotation timing with a step of 0.5-degree, in which the setting values of 0 to 720 can be set for 360 degrees because a step of 0.5-degree is used, and the rotation timing of the color wheel 120 can be adjusted using the setting values.

Figure 6:
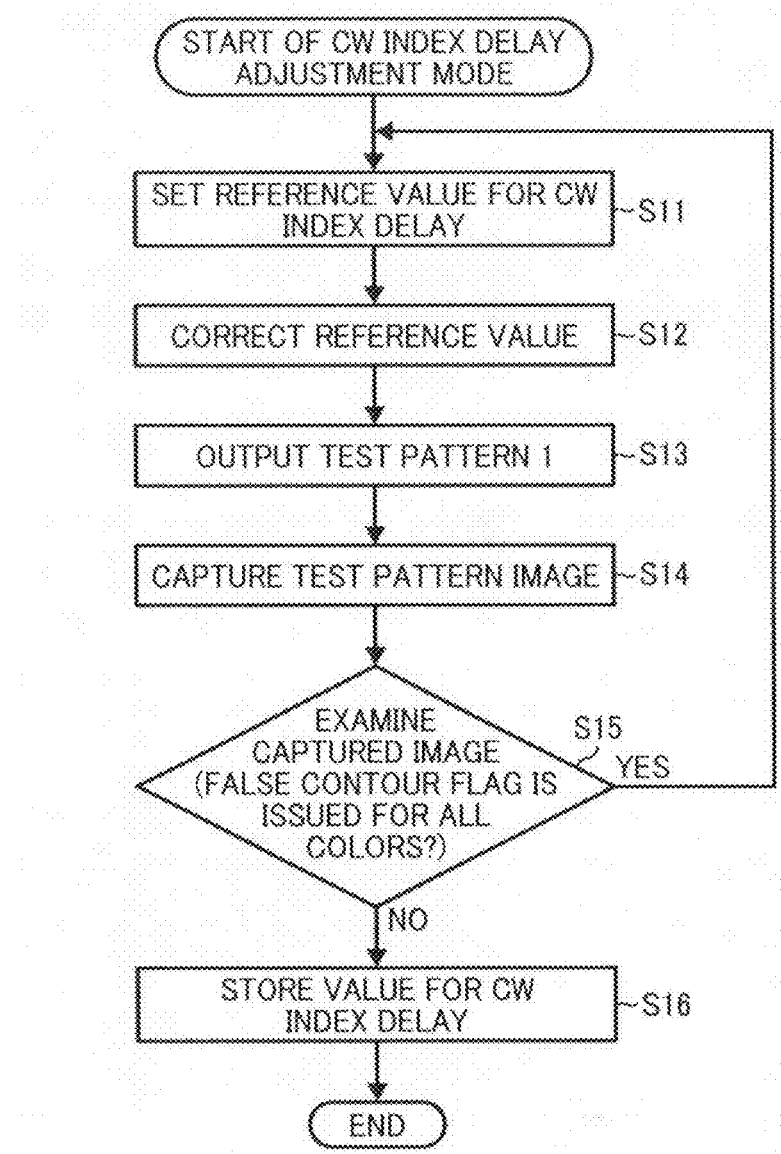
FIG. 6 shows a flowchart of steps of an adjustment process of a rotation control parameter a color wheel.

FIG. 6 shows a flowchart of steps of adjustment process of a rotation control parameter of the color wheel 120, which is termed as the CW IndexDelay adjustment. The setting value of CW IndexDelay is expressed by a sum of a reference value and a correction amount for the reference value. When the CW IndexDelay adjustment control is started, a currently setting value of CW IndexDelay is set as the reference value (step S11). For example, if a currently setting value of CW IndexDelay is 360, the reference value is set 360.

Then, a correction of the reference value is conducted (step S12). In the reference value correction, the setting value of CW IndexDelay is changed, for example, by adding one (1) to the reference value, in which the correction amount becomes +1. For example, if the reference value is 360, the setting value of CW IndexDelay becomes 361 by conducting one time of reference value correction process using the correction amount of +1. Further, the number of times of the correction of reference value can be stored in a counter, At step S13, the test pattern output 1 is conducted, in which the test pattern image (Hue-Saturation plane) shown in FIG. 4 is output and a projected image is captured at the timing of image 1 (see FIG. 5) to obtain image data of the captured image, and the captured image is examined similar to the above described captured image examination (steps S13 to 15). If the false contour flag is issued for all colors (step S15: YES), the process returns to the CW IndexDelay adjustment, and then one (1) is added to the reference value again to change the setting value of CW IndexDelay to 362, and updates the counter (step S12), in which the setting value of CW IndexDelay is set 362 by adding one (1), and the counter becomes +2. The process flow of steps S13 to S15 is repeated.

Further, as shown in Table 1, when the counter becomes 5, the searching in a plus (+) plus direction is stopped, and the reference value is adjusted by reducing "1" from the reference value, which means that the searching of the setting value is then conducted in a minus (−) direction. When the searching in the minus (−) direction is being conducted, the counter becomes 10. When the counter becomes 10, the searching in the minus (−) direction is stopped, and then the searching in the plus (+) direction is re-started. In a case of FIG. 6, the reference value is set 360, but other reference value can be used.

TABLE 1

| Counter | Correction range in minus (−) direction | reference value | Correction range in plus (+) direction |
|---|---|---|---|
| 5 | | 360 | 1-5 |
| 10 | −1 to −5 | 360 | |
| 15 | | 360 | 6-10 |
| 20 | −6 to −10 | 360 | |
| 25 | | 360 | 11-15 |

Further, in a case of FIG. 6, the searching direction for the setting value of CW IndexDelay is switched between the plus (+) direction and the minus (−) direction when a value of the counter becomes multiples of five (5) such as 5, 10, . . . , which is a step of five, but the switching of searching direction of the reference value can be conducted using values other than 5. Further, in a case of FIG. 6, the searching of the setting value of CW IndexDelay is conducted alternatively in the plus (+) direction and the minus (−) direction when the counter counts a given value, but the searching of the setting value of CW IndexDelay is not limited to the alternative searching. Further, in a case of FIG. 6, when a value of the counter exceeds a given upper limit such as 30, the searching is ended, and an adjustment failure is issued, and then the adjustment control of the CW IndexDelay is not conducted, but proceeds to step S5 to output a test pattern such as test pattern output 2. The upper limit of the counter can be set any values. If the adjustment range of the setting value of CW IndexDelay is set too great, the searching time becomes too long, and thereby the upper limit of the counter is set, for example, 30.

Further, the adjustment control of the CW IndexDelay shown in FIG. 6 is conducted if the false contour flag is issued for all of colors R, Y, G, C, B, and M based on the image examination of the captured test pattern.

During the updating of the setting value of CW IndexDelay, S (Saturation) of R, Y, G, C, B, and M may change, and then the false contour flag is not issued for at least one color. In this case, the setting value of CW IndexDelay at such timing is set as a reference value of CW IndexDelay (step S11). When the reference value is changed, the counter used for the reference value correction is reset to 0.

Further, the change of reference value is conducted based on the value of S (Saturation). For example, it can be designed that the false contour flag is not issued for R, Y, G, C, B, M if the value of S (Saturation) is a given value or less such as 0.5 or less. With such a configuration, a computation load can be reduced. The adjustment control of the CW IndexDelay is conducted as above described.

Referring back to the flowchart of FIG. 3, a description is given of when the adjustment control of the CW IndexDelay is not conducted at step S3 (step S3: NO). In this case, a test pattern output 2 is conducted (step S5). In the test pattern output 2, the test pattern for Hue-Saturation plane for image adjustment (FIG. 4) is output and projected, and the first frame and the second frame of projected test pattern image are captured at the timing of image 1 and image 2 shown in FIG. 5 (step S6).

Then, it is determined whether the γ adjustment is required for images based on image data of the test pattern image captured at the timing of image 1 and image 2, which will be described later (step S7). The consecutively captured image 1 (first frame image captured at the timing of image 1) and image 2 (second frame image captured at the timing of image 2) are projected as still images. Therefore, if positions of pixels on the image 1 and positions of pixels on the image 2 are at the same positions, the values of the pixels should be the same, but some positions of pixels do not become the same.

Figure 7:
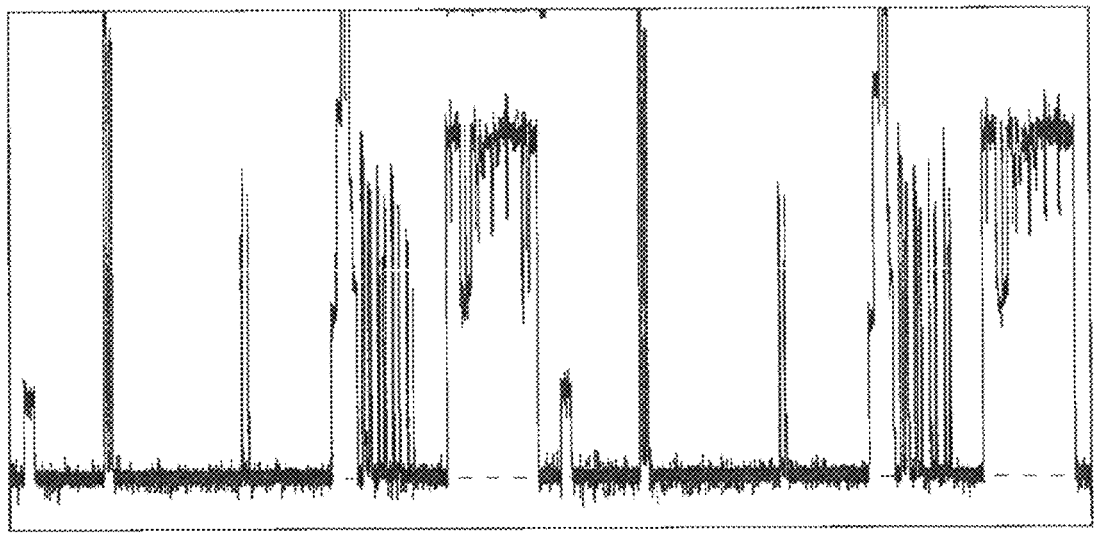
FIG. 7 shows a brightness profile of a specific pixel such as (RGB)=(0, 126, 255) of a first frame of a captured projected image of a test pattern.
Figure 8:
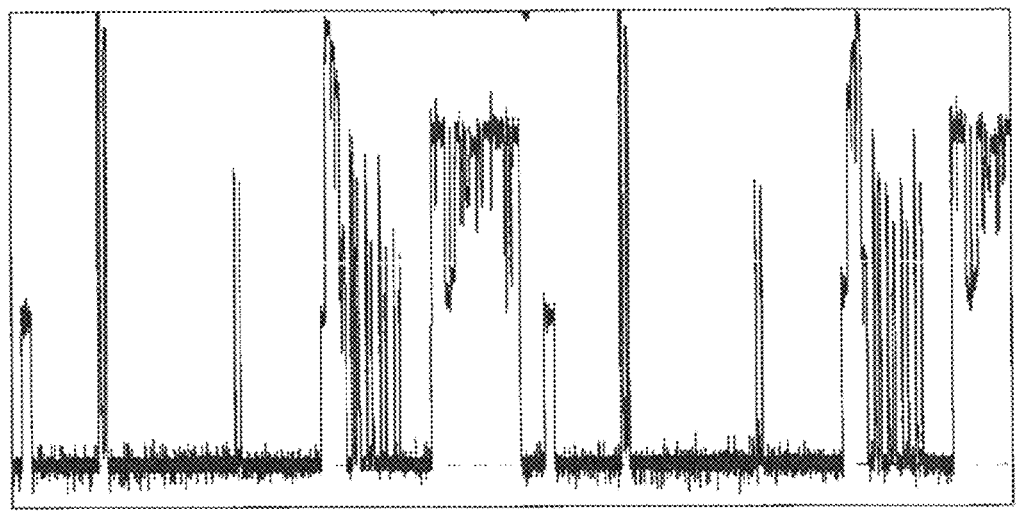
FIG. 8 shows a brightness profile of specific pixel such as (RGB)=(0, 126, 255) of a second frame of a captured projected image of a test pattern.

FIG. 7 shows a profile of the brightness of a pixel having a value of (RGB)=(0, 126, 255) when the first frame image of the test pattern image is captured at the timing of image 1 shown in FIG. 5. Further, FIG. 8 shows a profile of the brightness of a pixel having a value of (RGB)=(0, 126, 255) when the second frame of the test pattern image is captured at the timing of image 2 shown in FIG. 5. The profiles shown in FIGS. 7 and 8 are obtained at the same pixel such as (RGB)=(0, 126, 255) but the property of cyan (Cy) segment light and green (G) segment light becomes different, which means the pixel having (RGB)=(0, 126, 255) in the image data of the test pattern used for image projection may become a pixel having (RGB)=(0, 124, 255) for the image 1, and may become a pixel having (RGB)=(0, 128, 255) for the image 2, by which the pixels are displayed at different display timing. As above described, among a plurality of different frames projected at different timing, difference may occur on pixel values in the projected image, by which the image can be projected with variation of half-toning expression.

Figure 9:
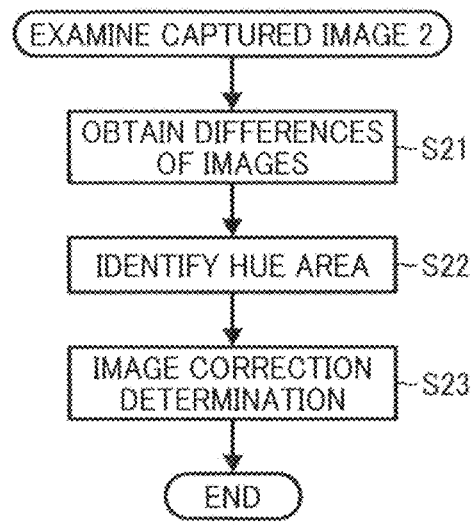
FIG. 9 shows a flowchart of steps of a process of determining whether γ adjustment is required for a captured image.
Figure 10:
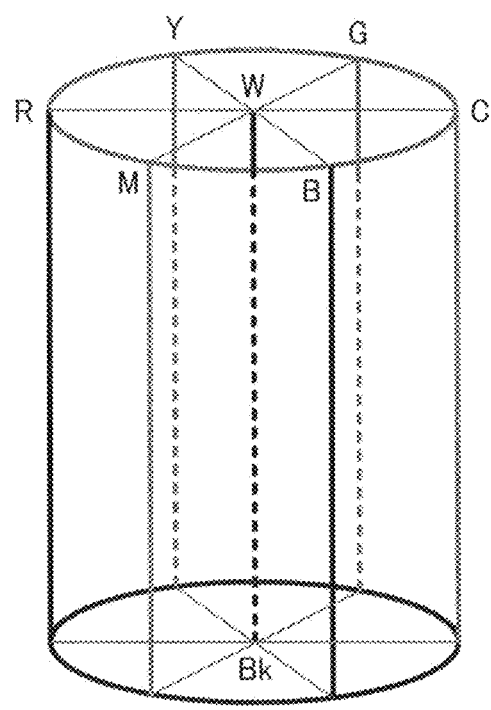
FIG. 10 shows a half toning of each single color in a test pattern used for γ adjustment in the vertical direction.

FIG. 9 shows a flowchart of steps of a process in step S7 which determines whether the γ adjustment is required for a captured image. Further, FIG. 10 shows a half-toning of each single color in the vertical direction included in a test pattern used for the γ adjustment. As shown in FIG. 10, a test pattern is a circle, and a line extending from the center point, indicated by W, to the highest saturation point S=1 of each of colors of RGB is used, and angles of the lines are detected under a given resolution. For example, the detectable resolution of the line with respect to a rotation angle of 360 degrees is, for example, 2 degrees, which is obtained by dividing 360 degrees with 180 parts. Detection values of the angle of lines of the plurality of colors detected by the resolution become data group expressed as whole numbers from 0 to 179. Further, the resolution of angle, which is related to an execution time and a precision level of a calibration or adjustment mode, can be changed in view of the execution time and precision level of the calibration.

Whether the γ adjustment is required for the captured image can be determined as shown in FIG. 9. Initially, as for a test pattern image projected for the γ adjustment, difference of captured image 1 (first frame image) and image 2 (second frame image) is obtained (step S21). The difference of the images can be obtained, for example, as follows. The data group of each color in the image 1 is assumed as Image 1 [0-179], and the number of data of each data group is set with 256. For example, as for the computing of 256 data, 256 pixels is extracted from pixel data, wherein 256 is the resolution of image data. Under the condition that the number of pixels of data group of each color is "n," and the number of pixel data of each data group is 256 as above described, the 0-th position is set with white (used as a starting point), and then the position of pixel at the k-th position can be expressed as "n×k/255" (cut off after the decimal point), and thereby the data group of image 1 becomes Image 1 [0-179] [n×k/255] (n is the number of pixels, k=0 to 255). Further, because the pixel data is RGB data, the data of pixel at the k-th position of image 1 can be expressed as follows for each of RGB.

Image 1[0-179]*[n×k/255][R]*

Image 1[0-179]*[n×k/255][G]*

Image 1[0-179]*[n×k/255][B]*

Similarly, the data of pixel at the k-th position of image 2 can be expressed as follows for each of RGB.

Image 2[0-179]*[n×k/255][R]*

Image 2[0-179]*[n×k/255][G]*

Image 2[0-179]*[n×k/255][B]*

If the difference of image 1 and image 2 is defined as dImage [0-179][n×k/255], the difference of each RGB data of two images can be expressed as follows. If the difference of any one of RGB data is not zero, it can be detected that the pixel values do not match between the two images.

dImage[0-179]*[n×k/255][R]* dImage[0-179]*[n×k/255][G]* dImage[0-179]*[n×k/255][B]*

Further, the allowable level of difference can be set in view of system performance and detection precision. For example, if the dImage is two or less, the two images are assumed as the same.

In the above described example, if dImage [0] is defined as a boundary R and M, Hue Index of R, Y, G, C, B, and M corresponding to "x" of dImage [x] is set, for example, as shown in a relationship table (Table 2).

TABLE 2

| Position of angle on Hue-Saturation plane | Index |
|---|---|
| 0-29 | R |
| 30-59 | Y |
| 60-89 | G |
| 90-119 | C |
| 120-149 | B |
| 150-179 | M |

Figure 11:
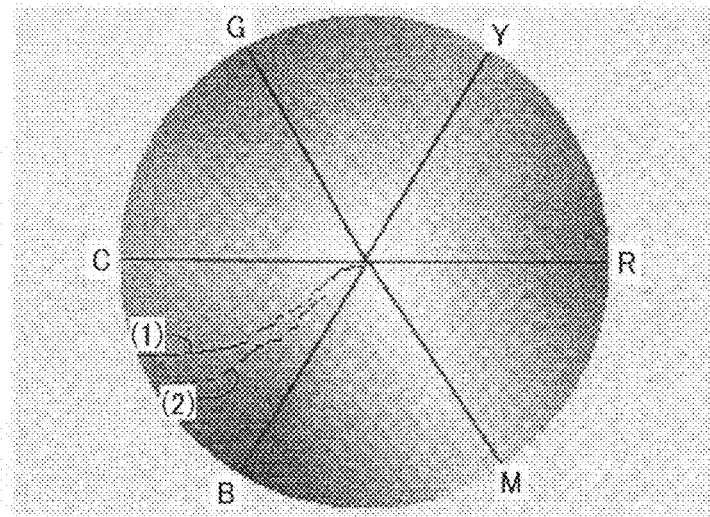
FIG. 11 shows an example of false contours appeared on a test pattern.

Then, a Hue area for the γ adjustment candidate is identified (step S22). The Hue area for the γ adjustment candidate can be identified by extracting a Hue corresponding to the number of pixel that a difference of pixel value occurs in dImage [0-179]. For example, as shown in FIG. 11, when a false contour phenomenon is observed in (1) dImage [116-122] area, and a false contour phenomenon is observed in (2) dImage [124-128] area, dImage [116-119] is C Hue and dImage [120-122] is B Hue in the area of (1), and dImage [124-128] is all B Hue in the area of (2) based on the relationship table (Table 2). Therefore, the C Hue and B Hue become the γ adjustment candidate. As above described, the Hue area for the γ adjustment candidate can be identified.

Then, it is determined whether an image correction is conducted for the Hue area identified as the γ adjustment candidate (step S23). For example, as for C Hue and B Hue extracted by the above described step S22 for identifying Hue area, the number of pixels (C_num, B_num), having pixel data value other than zero, can be expressed by formulas (6) and (7).

$$C\_num = d\mathrm{Image}[116\text{-}119] \quad (6)$$

$$B\_num = d\mathrm{Image}[120\text{-}122, 124\text{-}128] \quad (7)$$

Then, as for the C Hue area and B Hue area identified as the γ adjustment candidate, difference of pixel data is accumulated and extracted. The accumulated value (C_d, B_d) can be expressed by formulas (8) and (9).

$$C\_d = \Sigma d\mathrm{Image}[116\text{-}119][n \times k/255][RGB] \quad (8)$$

$$B\_d = \Sigma d\mathrm{Image}[120\text{-}122, 124\text{-}128][n \times k/255][RGB] \quad (9)$$

Therefore, the average of difference of pixel data in each of the C Hue area and B Hue area (C_ave, B_ave) can be expressed by formulas (10) and (11).

$$C\_ave = C\_d/C\_num \quad (10)$$

$$B\_ave = B\_d/B\_num \quad (11)$$

A correction threshold value to determine whether the image correction is to be conducted for the γ adjustment candidate may be set as p_c for C Hue, and p_b for B Hue.

If C_ave>p_c, the γ change flag for C Hue area is issued, and the value of C_num and the value of C_ave are retained. Further, if B_ave>p_b, the γ change flag for B Hue area is issued, and the value of B_num and the value of B_ave are retained. The correction threshold values (p_c, p_b) may be expressed with 8 bit. If the correction threshold value becomes three or so with 8 bit, the deviation of brightness may be observed, and thereby the γ adjustment or correction is to be conducted. Further, the correction threshold values (p_c, p_b) can be changed depending on properties of machines. Further, whether the image correction is to be conducted for the γ adjustment candidate can be determined using other determination method.

Referring back to the flowchart of FIG. 3, if the γ change flag is not issued for the captured image at step S7, it is determined that the γ correction is not required (step S7: NO), and then the calibration process ends. In contrast, if the γ change flag is issued (step S7: YES), the γ adjustment or correction is conducted (step S8). The γ adjustment may be conducted a scheme, for example, shown in FIG. 10, in which half-toning of each single color is displayed in the vertical direction.

In the projector 1 according to the example embodiment, the color can be reproduced by controlling the sequence drive of micro mirrors while synchronized to a rotation of the color wheel 120, which is composed of a circle shape having a plurality of colors, and thereby the γ correction can be conducted easily for each of R, G B, C, M, and Y. At step S7, a Hue area for the γ correction is selected based on the examination of captured image, and then γ correction is conducted for the selected Hue area.

Each projector has its own color reproduction property, and input signals of projected image and brightness of a projected image may not have a proportional relationship. When the input X, which is RGB value having the maximum value of 1, and the output Y, which is the brightness at a screen having the maximum value of 1, the property of projector can be approximated by a formula of Y=Xγ. If the input signal of RGB is input to the projector as it is, the projected image becomes darker, and the brightness of RGB changes, by which the color cannot be displayed correctly. To avoid the incorrect color display, the gamma (γ) correction is conducted to set the property of projector with a condition of Y=Xγ, which may have a linear relationship as close as possible by setting the value of RGB greater in advance.

As for the γ correction, γ is an exponential coefficient for an input value. If γ=1, the projector property becomes linear. Further, if 1>γ, the contrast becomes weak. If 1<γ, the contrast becomes strong. Because a false contour occurs due to the strong contrast, the γ correction is conducted by setting a value with a relation of 1>γ.

Hereinafter, the γ correction is conducted, for example, for half-toning of B and C shown in FIG. 10 when the γ change flag is issued. The γ coefficient (γ_c) for C can be expressed by a formula (12), in which "α" is a correction coefficient of one or less such as α=0.01.

$$\gamma\_c = 1 + C\_ave \times \alpha \quad (12)$$

Similarly, they coefficient (γ_b) for B can be expressed by a formula (13), in which β is a correction coefficient of one or less such as β=0.01.

$$\gamma\_b = 1 + C\_ave \times \beta \quad (13)$$

The correction coefficients (α, β) determine an adjustment pitch for the γ correction. If the correction coefficients (α, β) are set too great, an excessive correction is conducted and then the γ correction may not be conducted correctly, and if the correction coefficients (α, β) are too small, a calibration time becomes too long.

As shown in FIG. 3, upon conducting the γ correction, the test pattern output 2 and image capturing are conducted again, and a captured image is examined again (steps S5 to S7).

The correction may be conducted for a plurality of times as follows, in which for example, C_num and C_ave, B_num and B_ave for the first time are retained. The number of pixels having pixel data other than zero and the difference of average value of pixel data are accumulated as follows for the second time and subsequent time such as C_num2 and C_ave2, B_num2 and B_ave2, C_num3 and C_ave3, B_num3 and B_ave3, and so on.

Whether the image correction is conducted or not is determined based on 1) average value determination and 2) number of pixels determination, in which the average value determination is conducted at first and then the number of pixels determination is conducted. If a given condition of the average value determination and a given condition of the number of pixels determination are satisfied, it is determined that the image correction is not required, which means the correction is completed.

1) Average Value Determination

As for the average value determination, the image correction is completed when the average value of difference of each Hue becomes less than a given threshold value. For example, if the threshold values for C Hue and B Hue are set as C_MIN, B_MIN, the γ correction for each Hue is completed when the average value of difference of pixel data satisfy the condition expressed by formulas (14) and (15).

$$C\_ave \leq C\_MIN (C\_MIN \geq 0) \quad (14)$$

$$B\_ave \leq B\_MIN (B\_MIN \geq 0) \quad (15)$$

2) Number of Pixels Determination

As for the number of pixels determination, the image correction is completed when the pixel group, generating the difference on images, becomes less than a given value. The pixel group means the number of pixels in one Hue, or the number of pixels in one Hue and adjacent Hue. When R, Y, G C, B, and M are arranged in the order of Hue, each Hue can be adjacent to other Hue as follows (see FIG. 4).

R: MY
Y: RG
G: YC
C: GB
B: CM
M: BR

In the above described example, the C Hue and the B Hue are used as the correction target. Therefore, the concerned adjacent pixels are pixels of G, B, C, and M Hue. If the pixel data of adjacent pixels in G B, C, and M Hue is other than zero, the number of pixels (CB_num) can be expressed with a following formula (16).

$$CB\_num = C\_num + B\_num (+ G\_num + M\_num) \quad (16)$$

Because G_num=0 and M_num=0 can be set for this example case, the number of adjacent pixels becomes (C_num+B_num). The adjacent pixels are considered because the Hue may deviate when the contrast is changed, and because it is difficult to determine whether the γ correction is conducted effectively based on the number of pixels of C_num or B_num alone. Further, if the difference occurs on pixel data in Y Hue, the condition can be determined for each of the related Hue groups with a similar manner.

The number of adjacently detected pixels (CB_num0, CB_num1) can be expressed by the following formulas (17) and (18). If CB_num1<CB_num0 occurs, it means that the difference of pixel data between the image 1 and the image 2 becomes smaller, and the γ correction flag is still set for C Hue and B Hue, and then another γ correction is conducted. If the number of pixels becomes less than a given value, for example, at the third time of γ correction, CB_num1=CB_num2 can be set, by which the γ correction can be settled and completed. Then, the γ correction flag for C Hue and B Hue are cancelled.

$$CB\_num0 = C\_num0 + B\_num0 \quad (17)$$

$$CB\_num1 = C\_num1 + B\_num1 \quad (18)$$

Further, in the above example embodiment, two frames of captured image are used, but the number of frames is not limited two frames. For example, images may be projected with a plurality of frames more than two frames. When images are composed of a plurality of frames or multi-frames, projected images can be captured for the plurality of frame, and the difference of pixel data can be managed as similar to the above example embodiment.

Figure 12:
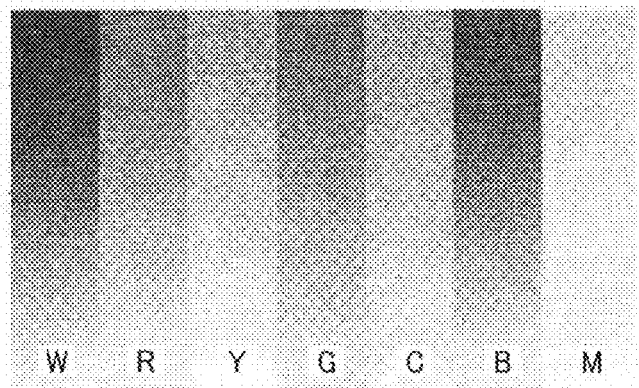
FIG. 12 shows an example test pattern for detecting Value-Hue plane with respect to white.
Figure 13:
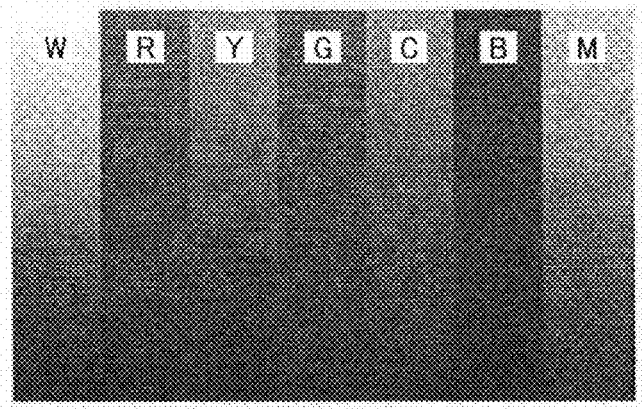
FIG. 13 shows an example test pattern for detecting Value-Hue plane with respect to black.

Further, in the above example embodiment, the test pattern of Hue circle image shown in FIG. 4 is projected onto the screen 2 and used for correcting the image by detecting the value in Hue-Saturation plane, but other test pattern can be used similarly. For example, as shown in FIGS. 12 and 13, test patterns outputting an image by segmenting Value direction can be used. FIG. 12 shows a test pattern having Value-Hue plane with respect to white, and FIG. 13 shows a test pattern having Value-Hue plane with respect to black. By projecting the test patterns, more detailed image information can be obtained, and half-toning correction can be conducted more precisely. Further, the test pattern of FIG. 12 or 13 and the test pattern of FIG. 4) can be projected onto the screen 2 concurrently, in which the image correction can be conducted efficiently and effectively using the projected images on the screen 2, and thereby the detection precision and the calibration speed can be enhanced.

The above described image projection apparatus includes the light source 110, the projected image outputting unit 130, and the control unit 100. The projected image outputting unit 130 such as a DMD has multiple mirrors arranged in a matrix pattern, and the angle of light reflection face can be controlled when light is radiated from the light source 110. The control unit 100 such as a processing circuit controls the angle of light reflection face of each of the mirrors of the projected image outputting unit using a time division half-toning control based on image data of an image, projected by the projected image outputting unit 130 and settings of control parameters used for the time division half-toning control. The image capturing device, which is the camera module 10, captures a projected image output by the projected image outputting unit 130. The control unit 100 can be used as the correction unit to correct the settings of control parameters for the time division half-toning control. The control unit 100 instructs the projected image outputting unit (130) to project a test pattern image for image adjustment. When the control unit 100 detects a false contour in the test pattern image based on image data of the projected test pattern image captured by the image capturing device, the control unit 100 corrects the settings of control parameters for the time division half-toning control based on a detection result of the false contour to suppress occurrence of the false contour. As above described, the large numbers of micro mirrors arranged in a matrix pattern are controlled by the time division half-toning control to project the test pattern image for image adjustment, and based on image data of the captured projected test pattern image, the false contour is detected. Based on the detection result of the false contour, the control parameter of the time division half-toning is corrected, by which when the large numbers of micro mirrors arranged in a matrix pattern is controlled by the time division half-toning, the false contour can be reduced.

In the above described image projection apparatus, the projected image outputting unit 130 includes a rotatable color wheel 120. The color wheel 120 has a filter composed of three colors corresponding to three primary colors disposed along a circumferential direction of the color wheel 120. The control unit 100 rotates the color wheel 120 of the projected image outputting unit 130 to pass the light emitted from the light source through the filter having three colors sequentially, and radiates lights of the three primary colors to the mirrors sequentially to project a test pattern image of color image. The control unit 100 detects a false contour by analyzing saturation change at pixels corresponding to the three primary colors included in image data of the projected test pattern image captured by the image capturing device. When a false contour is detected at the pixels, especially all pixels, corresponding to the three primary colors, the control unit 100 corrects a setting value of rotation timing of the color wheel 120. As above described, when the false contour is detected for all pixels corresponding to three primary colors, the color wheel 120 may not be synchronized correctly. Therefore, by correcting the setting value of the rotation timing of the color wheel 120 to set the correct synchronization, the false contour can be reduced.

In the above described image projection apparatus, by rotating the color wheel 120 for a plurality of times under the control of the control unit, one test pattern can be projected for a plurality of frames, and the image capturing device can capture the plurality of frames of projected test pattern images. Then, by analyzing the difference of the number of pixels among the plurality of frames, a Hue area having a false contour can be identified, and then the settings of control parameters for the gamma (γ) property for the Hue area having the false contour can be corrected. As above described, by projecting a plurality of frames for one test pattern image, capturing the plurality of frames of the projected test pattern image, and analyzing the difference of the number of pixels among the plurality of frame, a Hue area having a false contour can be identified. Then, by correcting the settings of control parameters for the gamma (γ) for the identified Hue area, the image contrast can be corrected, and the false contour can be reduced.

In the above described image projection apparatus, the correction unit instructs the projected image outputting unit 130 to project a plurality of different types of test pattern images, in which the projected image outputting unit 130 can output a fine test pattern. Therefore, the detection precision of false contour can be enhanced, and the time division half-toning control can be conducted more precisely.

In the above described image projection apparatus, as for the plurality of different types of test patterns, a test pattern image indicating a relationship of Hue and Saturation, and a test pattern image indicating a relationship of Value and Hue can be projected. The image capturing device can capture the test pattern image indicating a relationship of Hue and Saturation, and the test pattern image indicating a relationship concurrently, by which a correction speed by the control unit used as the correction unit can be enhanced.

In the above described image projection apparatus, when the false contour is detected, the control unit can instruct the projected image outputting unit 130 to project a test pattern image by enlarging a portion of the false contour. By projecting the enlarged view for the false contour, the resolution of image captured by the image capturing device can be enhanced, by which the correction precision of the time division half-toning control can be enhanced.

In the above-described example embodiment, a large numbers of micro mirrors arranged in a matrix pattern are controlled using the time division half-toning control for projecting a test pattern image used for an image adjustment, and based on image data of captured test pattern image, a false contour is detected. Based on a detection result of the false contour, the control parameters of the time division half-toning control are corrected, by which a false contour can be reduced when controlling the large numbers of micro mirrors arranged in the matrix pattern using the time division half-toning control.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus, comprising:
   a light source;
   a projected image outputting unit having multiple mirrors arranged in a matrix pattern, to which radiating light emitted from the light source is directed while controlling an angle of a light reflection face of each of the mirrors;
   a control unit having a processing circuit, to control the angle of the light reflection face of each of the mirrors of the projected image outputting unit using time division half-toning control based on image data of an image projected by the projected image outputting unit and control parameters used for the time division half-toning control; and
   an image capturing device to capture the image projected by the projected image outputting unit,
   wherein the control unit instructs the projected image outputting unit to project a test pattern image for image adjustment,
   wherein when the control unit detects a false contour in the test pattern image based on image data of the projected test pattern image captured by the image capturing device, the control unit corrects the control parameters for the time division half-toning control based on detection of the false contour to suppress occurrence of the false contour,
   wherein when the false contour is detected, the control unit instructs the projected image outputting unit to project an image by enlarging a portion of the false contour.

2. The image projection apparatus of claim 1, wherein the projected image outputting unit includes a rotatable color wheel, the color wheel having a filter composed of three colors corresponding to three primary colors and disposed along a circumferential direction of the color wheel, wherein the control unit rotates the color wheel of the projected image outputting unit to pass the light emitted from the light source through the filter having three colors sequentially, and radiates lights of the three primary colors to the mirrors sequentially to project the test pattern image of color image, wherein the control unit detects the false contour by analyzing saturation change at pixels corresponding to the three primary colors included in image data of the projected test pattern image captured by the image capturing device, wherein when the false contour is detected at the pixels corresponding to the three primary colors, the control unit corrects rotation timing of the color wheel.

3. An image projection apparatus, comprising:
   a light source;
   a projected image outputting unit having multiple mirrors arranged in a matrix pattern, to which radiating light emitted from the light source is directed while controlling an angle of a light reflection face of each of the mirrors;
   a control unit having a processing circuit, to control the angle of the light reflection face of each of the mirrors of the projected image outputting unit using time division half-toning control based on image data of an image projected by the projected image outputting unit and control parameters used for the time division half-toning control; and
   an image capturing device to capture the image projected by the projected image outputting unit,
   wherein the control unit instructs the projected image outputting unit to project a test pattern image for image adjustment,
   wherein when the control unit detects a false contour in the test pattern image based on image data of the projected test pattern image captured by the image capturing device, the control unit corrects the control parameters for the time division half-toning control based on detection of the false contour to suppress occurrence of the false contour,
   wherein the projected image outputting unit includes a rotatable color wheel,
   the color wheel having a filter composed of three colors corresponding to three primary colors and disposed along a circumferential direction of the color wheel,
   wherein the control unit rotates the color wheel of the projected image outputting unit to pass the light emitted from the light source through the filter having three colors sequentially, and radiates lights of the three primary colors to the mirrors sequentially to project a test pattern image of color image,
   wherein the control unit detects a false contour by analyzing saturation change at pixels corresponding to the three primary colors included in image data of the projected test pattern image captured by the image capturing device,
   wherein when a false contour is detected at the pixels corresponding to the three primary colors, the control unit corrects rotation timing of the color wheel,
   wherein the control unit rotates the color wheel for a plurality of times to project a plurality of image frames for one test pattern,
   wherein the control unit identifies a hue area having a false contour by analyzing a difference in the number of pixels among the plurality of frames of the projected test pattern image captured by the image capturing device;
   wherein the control unit corrects the control parameters for gamma (γ) property for the hue area having the false contour.

4. The image projection apparatus of claim 1, wherein the control unit instructs the projected image outputting unit to project a plurality of different types of test pattern images.

5. The image projection apparatus of claim 4, wherein the plurality of different types of test pattern images includes a test pattern image indicating a relationship between hue and saturation, and a test pattern image indicating a relationship between value and hue.

6. The image projection apparatus of claim 3, wherein when the false contour is detected, the control unit instructs the projected image outputting unit to project an image by enlarging a portion of the false contour.

7. A method of projecting an image using an image projection apparatus having a light source and multiple mirrors arranged in a matrix pattern, to which radiating light emitted from the light source is directed while controlling an angle of a light reflection face of each of the mirrors,
   the method comprising the steps of:
   projecting a test pattern image for image adjustment;
   capturing a projected image of the test pattern image;
   detecting a false contour in the test pattern image based on image data of the captured test pattern image;
   controlling the angle of light reflection face of each of the mirrors using time division half-toning control based on image data of a projected test pattern image and a control parameters used for the time division half-toning control; and correcting the control parameters used for the time division half-toning control upon detecting the false contour to suppress occurrence of the false contour, wherein when the false contour is detected by the detecting, the controlling instructs the projecting to project an image by enlarging a portion of the false contour.

8. A non-transitory computer-readable storage medium storing a program that, when executed by a computer, causes the computer to execute a method of projecting an image using an image projection apparatus having a light source and multiple mirrors arranged in a matrix pattern, to which radiating light emitted from the light source is directed while controlling an angle of a light reflection face of each of the mirrors, the method comprising the steps of:

projecting a test pattern image for image adjustment;

capturing a projected image of the test pattern image;

detecting a false contour in the test pattern image based on image data of the captured test pattern image;

controlling the angle of light reflection face of each of the mirrors using a time division half-toning control based on image data of a projected test pattern image and a control parameters used for the time division half-toning control; and correcting the control parameters used for the time division half-toning control upon detecting the false contour to suppress occurrence of the false contour, wherein when the false contour is detected by the detecting, the controlling instructs the projecting to project an image by enlarging a portion of the false contour.

* * * * *